June 28, 1955     F. R. SEAVEY ET AL     2,712,034
DRY CELL BATTERIES
Filed June 27, 1949
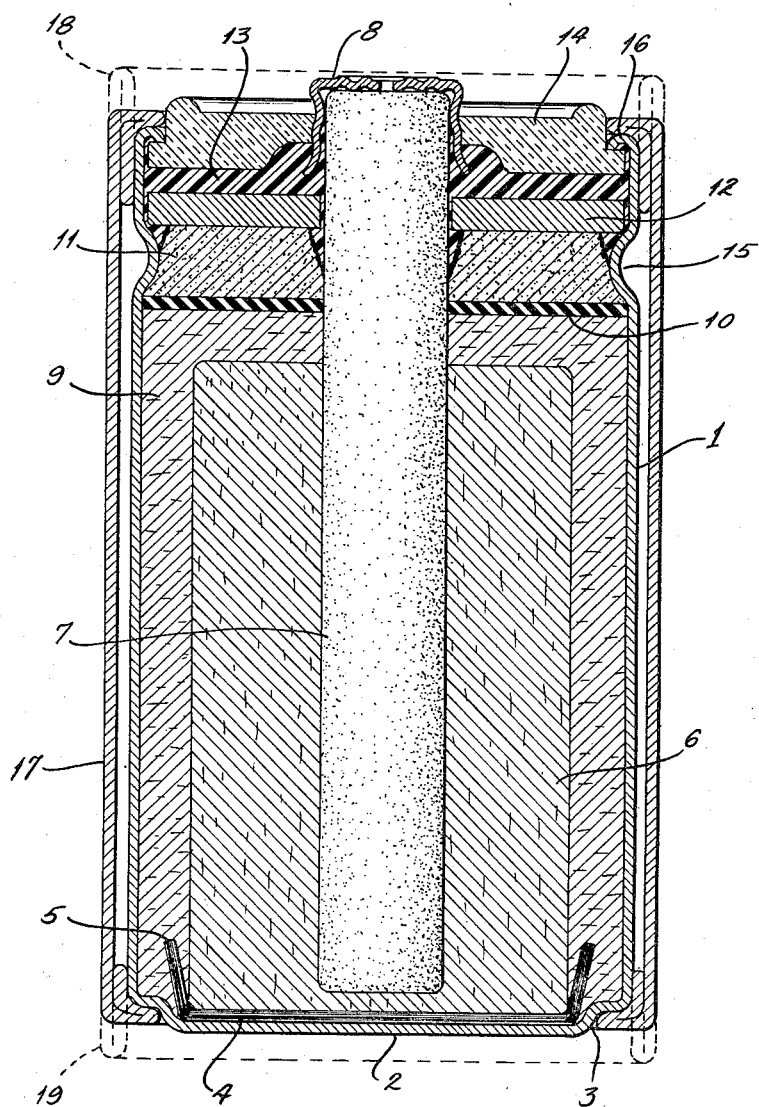
INVENTORS:
FREDERICK R. SEAVEY
HARTIEN S. RITTER
BY
ATTORNEYS.

United States Patent Office 2,712,034
Patented June 28, 1955

2,712,034

DRY CELL BATTERIES

Frederick R. Seavey, Alton, Ill., and Hartien S. Ritter, Barberton, Ohio, assignors to Olin Mathieson Chemical Corporation, a corporation of Virginia Application June 27, 1949, Serial No. 101,654

8 Claims. (Cl. 136—133)

This invention relates generally to dry cell batteries, and particularly to cells of the "leak-proof" type.

In dry cell batteries of the character customarily employed in flashlights and the like, sundry efforts have been made by those skilled in the art to render the cell "leak-proof" in the sense that the electrolyte and the reaction products of the electrolyte do not exude and exhibit themselves on the exterior of the cell assembly, with consequent deleterious action upon the flashlight or other instrument in which the cell may be employed. These efforts to provide a leak-proof cell have been addressed in the main toward the improvement of the so-called exudate trap, which generally takes the form of a paper or fiber sleeve arranged in spaced relation about the exterior of the zinc cup or can which constitutes one of the electrodes of the cell, and which is gradually consumed during discharge of the cell. While the provision of the usual exudate trap about the zinc cup of such a cell has greatly prolonged the life during which such a cell is fit for use, those skilled in the art have continued to realize that leakage and consequent swelling of the cell during service and during storage constituted a serious problem.

Little attention has heretofore been paid to the effect which the bodying components of the electrolyte paste might have upon leakage and swelling of such cells, and consequently it is the object of the present invention, generally stated, to improve the leak-proofness of a dry cell by coordinating the components of the electrolyte and the mechanical components of the cell.

Another object of the invention is to provide an improved electrolyte paste for dry cell batteries. A further object of the invention is to provide an end seal for dry cell batteries capable of confining the liquid products of reaction during discharge, and which may be readily and economically manufactured.

Still another object is to provide an exudate trap having adequate mechanical strength and resistance to moisture and exudate to minimize swelling of the cell assembly as the zinc cup is consumed in service.

And a still further object of the invention is to render uniform the corrosion of the zinc cup during service, and eliminate so-called "line perforation" adjacent shielded areas of the zinc cup.

Other objects will become apparent to those skilled in the art when the following description is read in connection with the accompanying drawings, in which the single figure is an axial sectional view of a dry cell constructed in accordance with the present invention.

The dry cell of the present invention, in common with its predecessors in the art, includes a zinc cup containing a central carbon electrode surrounded by a depolarizing core, and the latter surrounded within the zinc cup by an electrolyte paste. The open end of the cup is sealed about the carbon electrode, and an exudate trap is provided about the exterior periphery of the zinc cup.

The invention is predicated upon the discovery that in such a dry cell battery having an exudate trap, early life leakage may be overcome if the electrolyte paste contains both starch and kieselguhr. The proportion of starch to kieselguhr required to produce the improved leak-proofness may vary over a considerable range provided that there is a substantial quantity of each, and that they are mutually well distributed throughout the electrolyte paste. Good results are achieved with starch in the proportion of 0.25 to 2.0 parts by weight to each part of kieselguhr. For best results, the mixtures of starch and kieselguhr should constitute between 23 and 40 percent of the wet weight of the electrolyte paste.

In carrying out the invention to accomplish the improved leak-proofness it is essential that the cell be provided with an adequate exudate trap, because the starch-kieselguhr paste does not completely eliminate the possibility of some perforation of the zinc cup, and of course does not eliminate the inevitability of consumption of the zinc cup during discharge. The starch-kieselguhr paste does delay and minimize perforation, and the limited quantity of exudate occurring appears to have the quality of inhibiting both the loss of moisture from the cell and swelling in the exudate trap. Although early life perforation is minimized and corrosion rendered uniform, there comes a time when the entire wall of the zinc cup has been consumed, and the exudate trap must be depended upon to prevent deleterious action of the reaction products upon the flashlight or other instrument upon which the cell is used. Consequently, while the invention is not limited to any particular form of exudate trap, it does envision improvement in the mechanical strength and imperviousness of this feature. Furthermore, the liquid produced during early stages of discharge with the starch-kieselguhr electrolyte is difficult to confine, and tends to creep past the conventional end seal. Accordingly the invention envisions an improved end seal, capable of confining the liquid produced during discharge.

The normal tendency of dry cells to "line perforate" adjacent areas of the zinc can which are shielded (as by the usual insulator in the bottom) is, according to the present invention, overcome by arranging an insulating spacer (which is impervious to the electrolyte) between the depolarizing core and the zinc can, so as to provide an electrolyte-impervious baffle therebetween whose terminus is located in substantially spaced relation with reference to both the can and the depolarizing core, thus eliminating shielded volumes of electrolyte adjacent shielded areas of the zinc can.

Referring now to the drawings for an illustrative embodiment of the invention, a zinc cup 1 is provided having an open top and a bottom 2 which is marginally indented as shown at 3. On the interior of the cup between the shoulders provided by the marginal indentations 3, an insulating spacer 4, having a continuous upturned lip 5 is provided. The spacer 4 is preferably (and, where line perforation is to be eliminated, essentially) formed of a material which is impervious to the electrolyte to be utilized. A suitable material for this purpose is one of the synthetic resins or plastics having sufficient dielectric strength or sufficiently high resistance to maintain a potential difference between the electrodes. Paper impregnated with such a resin or wax so as to render is impervious to the electrolyte may be used.

Arranged concentrically within the cup and within the flanges 5 of spacer 4 is the usual depolarizing core 6 and carbon electrode 7, the latter provided with a metallic cap 8.

The interspace 9 between the depolarizing core 6 and the interior of cup 1 is charged with an electrolyte paste which, in accordance with the present invention, contains as the body-giving constituent a mixture of starch and kieselguhr. As an example of such an electrolyte paste, the same may be compounded according to the following formula:

| Ingredients | Pounds per thousand cells |
| --- | --- |
| Kieselguhr | 2.7 |
| Cornstarch | 5.0 |
| Wheat flour | .91 |
| Ammonium chloride | 4.1 |
| Zinc chloride | 2.3 |
| Mercuric chloride | .035 |
| Water | 12.2 |

Either cereal or potato starch, or both, may be employed, and the kieselguhr may be of any type or source readily available on the market, but preferably of a mean fineness on the order of about 6 microns. Specifically, the fineness of the kieselguhr, utilized in the cells for which test results are hereinafter related, was as follows:

| | Per cent |
| --- | --- |
| +40 microns | 5 |
| −40, +20 microns | 13 |
| −20, +10 microns | 14 |
| −10, +6 microns | 19 |
| −6, +2 microns | 42 |
| −2 microns | 7 |

The other constituents of the electrolyte are optional, and may be constituted by any of a great variety of known ingredients for such electrolytes, since the present invention, insofar as the electrolyte is concerned, is limited to the body-giving constituents of the electrolyte paste.

After the zinc cup 1 has received the depolarizing core and a carbon electrode, and been charged with electrolyte paste, it is cooked and cured in the usual manner. Thereafter the open end of the zinc cup 1 is provided with a closure seal which, in accordance with the present invention, involves the emplacement of a paraffin impregnated cardboard washer 10, having a central perforation accommodating the carbon electrode, upon the charge of materials already in the cup 1. Upon the washer 10 a layer of dry kieselguhr 11 is applied. Above the kieselguhr 11 a fiber washer 12, likewise having a central perforation to accommodate the electrode 7 but being slightly smaller in outside diameter than the inside diameter of cup 1, is inserted. Over the assembly a charge of molten pitch 13 is applied. As clearly shown in the drawing, the pitch 13 migrates down along the outer wall of the electrode 7, and between the outer edge of washer 12 and the interior of cup 1. Initially the volume of pitch applied is preferably sufficient to submerge the lower extremities of cap 8. Thereafter the usual pre-molded closure 14 is applied while the charge of pitch 13 remains fluid. While the parts are held in the thus assembled relation, the side wall of cup 1 is crimped adjacent the charge of kieselguhr 11, so as to provide a circumferential groove 15 which not only prevents upward movement of the washer 10, but subjects the dry charge of kieselguhr and the adjacent fluid pitch to reduction in volume, causing the pitch to migrate upwardly about the outer edges of closure 14. Concurrently with the crimping of groove 15, or previous thereto or thereafter (provided the parts are held against axial displacement) the open end of cup 1 may be inturned and crimped into the shoulder of closure 14, as shown at 16.

Thereafter the exudate trap 17 is applied to the assembly. The exudate trap is a tube formed of spirally wrapped kraft paper to a wall thickness of approximately 0.035 inch. Alternatively, the tube may be of synthetic plastic or metal. When applied to the cell assembly, the tube is somewhat longer than zinc cup 1, and has its ends infolded, as shown in dotted lines at 18 and 19. The tube 17 has an interior lining of pitch applied before the ends thereof are infolded. The pitch renders the paper resistant to the action of moisture and exudate material. The upper and lower extremities of the tube are dipped in paraffin, and the extremities 18 and 19 inwardly crimped into the shoulder provided by the marginal indentation 3 at the bottom, and over the crimp 16 at the top.

To demonstrate the improved leak-proofness of dry cells constructed in accordance with the present invention over conventional "leak-proof" cells, a series of thirty-three cells, consisting of fifteen of the present invention and three each of six different commercial types, was subjected to dead short circuit for one week, and then examined for leakage. (NOTE.—The electrolyte pastes in the six types of standard cell apparently contained starch, but in only one instance was the specific composition of the electrolyte paste ascertained, to-wit: cornstarch 18 percent, wheat flour 10 percent, ammonium chloride 15.8 percent, zinc chloride 8 percent, mercuric chloride 0.2 percent, water 48 percent.) While not one of the cells constructed as herein described exhibited leakage at the end of a week, all but one of the eighteen standard cells tested for comparison exhibited leakage.

This improved leak-proofness is obtained without sacrifice of service life, shelf life and short circuit amperage, as in these categories the cells of the present invention rated no lower than third among the several types tested. In the shelf life test, after storage for ninety days after manufacture, the zinc cups of the several cells were examined, and those of the present invention showed significantly more uniform corrosion, and significantly less pitting, than any other.

Theoretical explanation of the striking improvement in leak-proofness is too uncertain to postulate. Suffice it to say that, while perforation of the zinc cup is not altogether eliminated by the provision of the starch-kieselguhr electrolyte paste, the exudate resulting therefrom is small in quantity and seems to have the property of impeding the loss of moisture from the electrolyte, and of obstructing the transmission of pressure to the interior of the exudate trap, so that the cells remain free of external evidence of leakage, and free of swelling. These characteristics endure not only during early life of the cell, but after prolonged service, when the zinc cup is well consumed.

While a complete disclosure of one embodiment of the invention has been set forth hereinabove, it is to be distinctly understood that the invention is not limited to the details of that embodiment. On the contrary, it is to be understood that the advantageous result of the starch-kieselguhr electrolyte paste may be achieved in a cell provided with any adequate exudate trap and end closure. Other features of the invention are applicable to cells charged with other electrolytes. Accordingly it is to be distinctly understood that the invention is susceptible of sundry modifications and advantages, without departing from the spirit thereof, or the scope of the appended claims.

Having thus described the invention, what is claimed and desired to be secured by Letters Patent is:

1. In a dry cell having an exudate trap about a zinc cup, said cup having a marginal indentation at the junction between its peripheral and bottom walls, said trap being a paperboard tube infolded at its bottom end to provide a double thickness thereat terminating in a fold, and said fold being inturned to a diameter less than that of the cup and interfitted with the marginal indentation of the cup, the end of the paperboard tube lying between the side of the tube and the side of the cup.

2. The cell of claim 1 wherein the upper end of the trap is infolded and inturned over the top edge of the cup, the end of the paperboard tube lying between the side of the tube and the side of the cup.

3. The cell of claim 1 wherein the trap is lined with pitch and the infolded end dipped in paraffin.

4. In a dry cell having a zinc cup charged with electrolyte, a closure for the top of said cup comprising, a layer of dry kieselguhr above but mechanically separated from the electrolyte, a layer of pitch above but mechanically separated from the kieselguhr, an impervious disc between the kieselguhr and the pitch, and another impervious disc above the pitch, said pitch being compressed and oozed about the edges of said discs.

5. In a dry cell of the character described comprising a zinc cup charged with electrolyte paste containing starch and kieselguhr, said cup having a marginal indentation at its bottom, a seal for the top of said cup comprising a layer of dry kieselguhr above the electrolyte but out of mechanical contact with the body thereof, a layer of pitch above the kieselguhr but out of mechanical contact therewith, impervious discs above and below the layer of pitch, said pitch being oozed about the edges of said kieselguhr and discs, the top of said cup being inturned about the edges of the uppermost one of said discs, an exudate trap consisting of a pitch lined paper tube whose ends are infolded and whose upper end is inturned over the inturned edges of the cup and whose lower end is inturned into said marginal indentation, and a dished insulator impervious to electrolyte nested in the bottom of said cup and within said marginal indentation, the side wall of said dished insulator extending axially upward for a distance beyond said marginal indentation approximately equal to the radial dimension of said marginal indentation.

6. The cell of claim 5 wherein a depolarizing core is seated within said insulator and the side wall of said insulator flares so as to be spaced from said core at its upper edge.

7. In a dry cell of the type having a zinc cup forming one of the electrodes and the container for an electrolyte; an exudate trap located about the zinc cup and an electrolyte paste in contact with the interior of the zinc cup, said electrolyte paste containing starch and kieselguhr aggregating between 23 and 40 per cent by weight of the paste, the starch being present in proportions of ¼ to 2 parts by weight of kieselguhr.

8. A dry cell as set forth in claim 7 wherein the kieselguhr-starch mixture is about 40% kieselguhr and 60% starch.

References Cited in the file of this patent

UNITED STATES PATENTS

| | | |
|---|---|---|
| 682,648, | Splitdorf | Sept. 17, 1901 |
| 1,653,800 | De Olaneta | Dec. 27, 1927 |
| 1,732,069 | Schorger | Oct. 15, 1929 |
| 1,991,132 | Anthony | Feb. 12, 1935 |
| 2,396,693 | Glover | Mar. 19, 1946 |
| 2,399,089 | Anthony | Apr. 23, 1946 |
| 2,427,561 | Keller | Sept. 16, 1947 |
| 2,541,931 | McEachron et al. | Feb. 13, 1951 |
| 2,552,091 | Glover | May 8, 1951 |
| 2,580,664 | Drummond | Jan. 1, 1952 |

FOREIGN PATENTS

| | | |
|---|---|---|
| 20,838 | Great Britain | of 1890 |
| 29,065 | Great Britain | of 1904 |
| 684,550 | Germany | Nov. 9, 1939 |

OTHER REFERENCES

"Electrical World," vol. 68, No. 27, December 30, 1916, page 1284, "Compound for Use in Rebuilding Dry Batteries."

Serial No. 394,417, Marhenkel (A. P. C.), published May 11, 1943, now abandoned.